United States Patent
Kimura et al.

(10) Patent No.: US 9,243,073 B2
(45) Date of Patent: Jan. 26, 2016

(54) CONDUCTIVE FILM AND MANUFACTURING METHOD THEREOF

(75) Inventors: Mitsuharu Kimura, Misato (JP); Yumiko Oomori, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 424 days.

(21) Appl. No.: 13/634,693

(22) PCT Filed: Mar. 10, 2011

(86) PCT No.: PCT/JP2011/055666
§ 371 (c)(1),
(2), (4) Date: Sep. 13, 2012

(87) PCT Pub. No.: WO2011/118407
PCT Pub. Date: Sep. 29, 2011

(65) Prior Publication Data
US 2013/0001477 A1    Jan. 3, 2013

(30) Foreign Application Priority Data

Mar. 25, 2010 (JP) ................................ P2010-069574

(51) Int. Cl.
| | |
|---|---|
| *H01B 1/20* | (2006.01) |
| *H01B 1/24* | (2006.01) |
| *C08B 15/02* | (2006.01) |
| *C08L 1/04* | (2006.01) |
| *H01B 1/22* | (2006.01) |
| *H01B 1/12* | (2006.01) |
| *H01B 1/14* | (2006.01) |

(52) U.S. Cl.
CPC . *C08B 15/02* (2013.01); *C08L 1/04* (2013.01); *H01B 1/127* (2013.01); *H01B 1/128* (2013.01); *H01B 1/14* (2013.01); *H01B 1/20* (2013.01); *H01B 1/22* (2013.01); *H01B 1/24* (2013.01)

(58) Field of Classification Search
CPC ............ C08B 15/02; C08L 1/04; H01B 1/20; H01B 1/14; H01B 1/24; H01B 1/127; H01B 1/128; H01B 1/22
USPC ........................ 252/500, 510, 519.3, 519.33
See application file for complete search history.

(56) References Cited

U.S. PATENT DOCUMENTS

| | | | |
|---|---|---|---|
| 8,029,896 B2 * | 10/2011 | Kumamoto et al. .......... | 428/393 |
| 2003/0170492 A1 | 9/2003 | Anderson et al. | |
| 2006/0127673 A1 * | 6/2006 | Aho et al. .................. | 428/411.1 |
| 2007/0172587 A1 * | 7/2007 | Shinohara ..................... | 427/162 |
| 2008/0175992 A1 * | 7/2008 | Plieth et al. .................... | 427/212 |
| 2009/0056854 A1 * | 3/2009 | Oh et al. ......................... | 156/60 |

FOREIGN PATENT DOCUMENTS

| | | |
|---|---|---|
| JP | 7-279043 | 10/1995 |
| JP | 2000-160500 | 6/2000 |
| JP | 2009-277736 | 11/2009 |
| WO | WO 2004/088039 | 10/2004 |
| WO | WO 2009020239 A1 * | 2/2009 |
| WO | WO 2009/069086 A2 | 6/2009 |
| WO | WO 2009/069641 A1 | 6/2009 |
| WO | WO 2009/101985 A1 | 8/2009 |

OTHER PUBLICATIONS

"Cellulose I and Cellulose II" Ellis, Bryan. Smith, Ray (2009). Polymers—A Property Database (2nd Edition). Taylor & Francis, pp. 113-117 and the front matter pages. Online version available at: http://app.knovel.com/hotlink/toc/id:kpPAPDE001/polymers-property-database/polymers-property-database.*
European Patent Office Search Report issued Oct. 31, 2013 in corresponding European Patent Application No. 11 759 214.7.
International Search Report of Corresponding PCT Application PCT/JP2011/055666 mailed Jun. 14, 2011.
Shinsuke Ifuku et al., "Synthesis of Silver Nanoparticles Templated by TEMPO-Mediated Oxidized Bacterial Cellulose Nanofibers", Biomacromolecules, vol. 10, American Chemistry Society, Aug. 4, 2009, pp. 2714-2717.
Chinese Office Action issued Feb. 16, 2015 in corresponding Chinese Patent Application No. 201180014681.1.
Saito et al., "Cellulose Nanofibers Prepared by TEMPO-Mediated Oxidation of Native Cellulose", Biomacromolecules, 2007, vol. 8, pp. 2485-2491.
Mihranyan et al., "A Novel High Specific Surface Area Conducting Paper Material Composed of Polypyrrole and Cladophora Cellulose", J. Phys. Chem. B, 2008, vol. 112, pp. 12249-12255.

* cited by examiner

*Primary Examiner* — Harold Pyon
*Assistant Examiner* — Katie L Hammer

(57) ABSTRACT

Disclosed is a high-strength conductive film having excellent conductivity which can be applied in electronic devices, and which further reduces unevenness in conduction. The conductive film comprises modified fine cellulose having at least a carboxyl group and one type or two or more types of conductive substance. Further, the conductive film is formed by a process involving a step for oxidizing cellulose to prepare modified cellulose, a step for making finer the modified cellulose by dispersing the same in a dispersion medium to prepare modified fine cellulose, a step for mixing the modified fine cellulose and the conductive substance to prepare a dispersion liquid, and a step for drying the dispersion liquid to form a conductive film.

18 Claims, No Drawings

CONDUCTIVE FILM AND MANUFACTURING METHOD THEREOF

CROSS-REFERENCE TO RELATED APPLICATIONS

This application is a U.S. national stage application of PCT/JP2011/055666 filed Mar. 10, 2011 and claims the foreign priority benefit of Japanese Application No. 2010-069574 filed Mar. 25, 2010 in the Japanese Intellectual Property Office, the contents of which are incorporated herein by reference.

The present invention relates to a conductive film and a manufacturing method thereof. More particularly, the present invention relates to a novel conductive film capable of realizing film products of high added value that are useful as electronic devices composed of all organic materials, and to a manufacturing method thereof.

BACKGROUND ART

Polyethylene terephthalate (PET) is most commonly used as a base material of conductive films, and this is followed by such materials as polyethylene sulfonate (PES), polycarbonate (PC) or polyarylate (PAR), which are used less frequently than PET. In addition, although examples of conductive substances include inorganic materials such as indium tin oxide (ITO), tin oxide (SnO), zinc oxide (ZnO) or cadmium tin oxide ($CdSnO_4$), ITO is used most commonly from the viewpoints of high conductivity and visible light transmission. Under the present circumstances, ITO-PET conductive films are applied in the form of flexible devices to various electronic devices. However, since PET uses fossil fuels in the manufacturing process thereof, it has a considerable effect on the environment with respect to reducing levels of fossil fuels, global warming and the like. In addition, since there are limitations on indium reserves, there is the risk of these reserves being depleted in the near future if indium continues to be used in this manner, and due to its price becoming extremely high, there is a pressing need to find an alternative among other materials.

On the other hand, growing attention is being focused on polysaccharides derived from natural materials for use as environmentally-friendly materials. Cellulose is contained in such sources as plant cell walls and external secretions of microorganisms or the mantle of sea squirts, is the most commonly found type of polysaccharide in the world, and is expected to be applied and deployed in carious fields due to its biodegradability, high crystallinity and superior stability and safety.

Since cellulose contains strong hydrogen bonds within its molecules and has high crystallinity, making it practically insoluble in water and ordinary solvents, considerable research has been conducted to improve its solubility. In particular, a technique that introduces a carboxyl group via an aldehyde by oxidizing the primary hydroxyl group at position C6 using a TEMPO (2,2,6,6-tetramethylpiperidinooxy radical) catalyst system makes possible to selectively oxidize only the primary hydroxyl group, and this technique has attracted attention in recent years since the reaction can also be carried out under mild conditions (aqueous system, room temperature). When TEMPO oxidation is carried out using natural cellulose, only the surface can be oxidized on the nanometer level while maintaining the crystallinity of cellulose. After washing, fine, modified cellulose can be uniformity dispersed in water by simply adding slight mechanical treatment.

An aqueous cellulose dispersion prepared using this method has a particle width on the nanometer order and is homogeneous, and as a result of drying, demonstrates high transparency in the visible light range and allows the obtaining of a film having high strength, thereby resulting in expectations for its application and deployment in various fields.

An example of a conductive base material using cellulose is described in Patent Document 1, which describes a conductive polymer composite paper produced by incorporating a conductive polymer in paper pulp. In addition, Patent Document 2 describes conductive paper obtained by mixing cellulose with a conductive substance.

PRIOR ART DOCUMENTS

Patent Documents

Patent Document 1: Japanese Unexamined Patent Application, First Publication No. 2000-160500

Patent Document 2: International Publication No. WO 09/101985

DISCLOSURE OF THE INVENTION

Problems to be Solved by the Invention

However, in the case of the conductive base material described, in Patent Document 1 or 2, the cellulose has a large size and coarse texture. This results in the risk of considerable limitations being placed therein when used in optical applications or display applications requiring transparency. In addition, since these base materials are not dispersed at a uniform size, problems result such as non-uniform conductivity and brittleness attributable to low strength.

With the foregoing in view, an object of the present invention is to provide a conductive film provided with superior conductivity capable of being applied to electronic devices, while also reducing conductivity non-uniformity and having high strength.

Means for Solving the Problems

As means for solving the aforementioned problems, the invention described in claim 1 is a conductive film comprised of modified fine cellulose having at least a carboxyl group, and one type or two or more types of a conductive substance.

In addition, the invention described in claim 2 is the conductive film described in claim 1, wherein the fiber width of the modified fine cellulose is 1 nm to 500 nm, and the amount of the carboxyl group is 1.0 mmol/g to 2.0 mmol/g.

In addition, the invention described in claim 3 is the conductive film described in claim 2, wherein the cellulose is natural, cellulose having a cellulose I type crystal structure.

In addition, the invention described, in claim 4 is the conductive film described in claim 3, wherein the conductive substance is a conductive polymer.

In addition, the invention described in claim 5 is the conductive film described in claim 4, wherein the conductive polymer is one type or two or more types selected from polythiophene, polypyrrole and polyaniline.

In addition, the invention described in claim 6 is the conductive film described in claim 3, wherein the conductive substance is fine carbon.

In addition, the invention described in claim 7 is the conductive film described in claim 3, which further contains an ionic liquid.

In addition, the invention described in claim 8 is the conductive film described in claim 3, wherein the haze value of the conductive film is 30% or less.

In addition, the invention described in claim 9 is a manufacturing method of a conductive film, comprising: a step for preparing modified cellulose by oxidizing cellulose, a step for preparing modified fine cellulose by refining the modified cellulose by dispersing in a dispersion medium, a step for preparing a liquid dispersion by mixing the modified fine cellulose with a conductive substance, and a step for forming a conductive film by drying the liquid dispersion.

In addition, the invention described in claim 10 is a manufacturing method of a conductive film, comprising: a step for preparing modified cellulose by oxidizing cellulose, a step for preparing a liquid dispersion containing modified fine cellulose by dispersing and refining the modified cellulose in a dispersion medium, a step for forming a film containing the modified fine cellulose by drying the liquid dispersion, and a step for forming a conductive film by coating a conductive substance onto the surface of the film.

Effects of the Invention

According to the present invention, a conductive film having high conductivity, high strength and additionally provided with transparency can be provided by using modified fine cellulose, having a carboxyl group on the surface thereof and obtained in a size on the nanometer order by electrostatic repulsion, for the primary base material, and compounding a conductive substance to form of a film. In addition, use of a biomass material in the manner of cellulose allows the realization of a carbon neutral society, while also making it possible to make an extremely large contribution to reducing the burden on the environment.

BEST MODE FOR CARRYING OUT THE INVENTION

The following provides a detailed explanation of the present invention.

The present invention relates to a conductive film having favorable electrical conductivity. The conductive film of the present invention uses for the primary base material thereof modified fine cellulose having a carboxyl group on the surface thereof and is finely dispersed in a solvent.

Examples of the configuration of the conductive film of the present invention include, but are not limited to the following:

(1) a conductive film in which a conductive substance is mixed into the entire film formed by drying from a state in which modified fine cellulose, having a carboxyl group on the surface thereof, is preliminarily mixed with a conductive substance in a solvent;

(2) a conductive film in which a conductive substance is only present on the surface thereof by drying modified fine cellulose, which has a carboxyl group on the surface thereof and is finely dispersed in a solvent, to form a film, followed by coating a conductive substance onto the film;

(3) a conductive film obtained by preparing another base material and laminating the film described in (1) or (2) onto that base material;

(4) a conductive film in which a conductive substance is present only on the surface thereof by preparing another base material, forming a film by coating modified fine cellulose, which has a carboxyl group on the surface thereof and is finely dispersed in a solvent, onto the base material, and coating the conductive substance onto the film; and (5) a conductive film having a film formed on another base material, by preparing the another base material, and drying from a state in which, modified fine cellulose having a carboxyl group on the surface thereof is preliminarily mixed with a conductive substance in a solvent.

The modified fine cellulose of the present invention has a carboxyl group, and the amount of the carboxyl group is preferably 1.0 mmol/g to 2.0 mmol/g. In the case the amount of the carboxyl group is less than 1.0 mmol/g, it becomes difficult to uniformly disperse the modified fine cellulose even if mechanical treatment is subsequently added since adequate electrostatic repulsion does not occur. Consequently, problems such as poor dispersion transparency and increased viscosity occur. In addition, in the case the amount of the carboxyl group exceeds 2.0 mmol/g, there is excessive decomposition of cellulose during dispersion resulting in increased susceptibility to problems such as yellowing. In the case the amount of the carboxyl group is within the range of 1.0 mmol/g to 2.0 mmol/g, a liquid dispersion of the modified fine cellulose has superior transparency and decomposition and the like can be inhibited. In particular, the modified fine cellulose of the present invention preferably has a carboxyl group on the surface of modified fine cellulose. The presence of a carboxyl group on the surface of the cellulose enables adequate occurrence of electrostatic repulsion within the cellulose, thereby making it possible to uniformly disperse the modified fine cellulose.

In addition, the fiber width of the modified fine cellulose of the present invention is preferably 1 nm to 500 nm. If the fiber width is less than 1 nm, the modified fine cellulose does not enter a state consisting of nanofibers, while if the fiber width exceeds 500 nm, transparency of the liquid dispersion is impaired.

A liquid dispersion containing the modified fine cellulose having a carboxyl group on the surface thereof used in the present invention is obtained by going through a step for modifying cellulose and a step for refining the modified cellulose as indicated below.

Cellulose Modification Step

Although wood pulp, non-wood pulp, waste paper pulp, cotton, bacterial cellulose, Valonia cellulose, sea squirt cellulose, fine cellulose or microcrystalline cellulose and the like can be used as cellulose raw materials, natural cellulose having a cellulose I type crystal structure is particularly preferable. In the case of using natural cellulose having a cellulose I type crystal structure, crystallinity is present within the cellulose, and that crystalline region is not eroded even after TEMPO oxidation. Consequently, only the surface is oxidized and individual cellulose molecules are in a nanofiber state without being isolated, thereby allowing the obtaining superior transparency and film formation.

Next, as means for modifying the cellulose, a method in which primary hydroxyl groups can be selectively subjected to an oxidation reaction while maintaining structure as much as possible, and uses a co-oxidant in the presence of an N-oxyl compound is preferable. TEMPO is preferably used for the aforementioned N-oxyl compound.

In addition, any oxidant can be used for the aforementioned co-oxidant provided it is able to accelerate an oxidation reaction, examples of which include halogens, hypohalous acids, halous acids and perhalogen acids or salts thereof, as well as halogen oxides, nitrogen oxides and peroxides. Sodium hypochlorite is preferable on the basis of availability and reactivity.

Moreover, the co-presence of bromides or iodides in the reaction system enables the oxidation reaction to proceed more smoothly, thereby improving the efficiency of carboxyl group introduction.

The amount of TEMPO used for the N-oxyl compound is only required to be that for functioning as a catalyst. In addition, a system in which sodium bromide is used as bromide is preferable on the basis of cost and stability. The amounts of co-oxidant, bromide or iodide used are only required to be those that enable promotion of the oxidation reaction. Moreover, the reaction system is preferably kept alkaline during the reaction, and the pH is more preferably 9 to 11.

In order to maintain the reaction system in an alkaline state, the pH can be regulated by adding an aqueous alkaline solution while holding constant. Although sodium hydroxide, lithium hydroxide, potassium hydroxide or aqueous ammonia solution and the like is used for the aqueous alkaline solution, sodium hydroxide is preferable on the basis of cost and availability.

In order to terminate the oxidation reaction, it is necessary to completely terminate reaction of the co-oxidant by adding another alcohol while maintaining the pH within the reaction system. An alcohol having a low molecular weight such as methanol, ethanol or propanol is preferable for the alcohol that is added since it terminates the reaction quickly. Ethanol is more preferable based on the safety of by-products formed by the reaction.

Examples of methods used to wash the oxidized pulp following completion of oxidation include washing after having formed a base and salt, washing by adding acid to form carboxylic acid, and washing by insolubilizing by adding an organic solvent. A method consisting of washing by adding an acid to form carboxylic acid is preferable on the basis of handling ease and yield. Furthermore, water is preferably used for the washing solvent.

Modified Cellulose Refinement Step

The method used to refine the acid-washed modified cellulose requires that the modified cellulose be immersed in water as a dispersion medium followed by regulating the pH to 3 to 12 with base. If the modified cellulose is refined after regulating the pH to 6 to 12, the modified cellulose is defibrated to the nanometer order by electrostatic repulsion of carboxyl groups, and transparency of the solution increases. In addition, at a pH of 3 to 6, electrostatic repulsion occurs with difficulty and the liquid is opaque. Examples of bases that can be used to regulate pH include lithium, hydroxide, sodium hydroxide, potassium, hydroxide and aqueous ammonia solution, as well as organic bases such as tetramethylammonium hydroxide, tetraethylammonium hydroxide, tetrapropylammonium hydroxide, tetrabutylammonium hydroxide or benzyltrimethylammonium hydroxide.

Although a stable dispersed state can be obtained in the case of using water for the dispersion medium, methanol, ethanol, isopropyl alcohol, tert-butanol, ethers, ketones or mixed solvents of two or more types thereof may also be used instead of water corresponding to various objectives such as improvement and control of drying conditions or liquid physical properties.

Next, the modified cellulose can be refined by using a method to physically defibrate the modified cellulose, examples of which include the use of a high-pressure homogenizer, ultra-high-pressure homogenizer, bead mill, ball mill, cutter mill, jet mill, grinder, juicer mixer, homomixer, ultrasonic homogenizer, nanogenizer or underwater opposing collision treatment. In this step, since a large amount of energy is required due to the increased viscosity of the liquid dispersion, the amount of modified cellulose in the liquid dispersion is preferably 10% by weight or less. Carrying out these refining treatments at arbitrary times makes it possible to obtain a liquid dispersion containing modified fine cellulose having a carboxyl group at position C6.

Next, an explanation is provided of the conductive substance used in the present invention.

The conductive substance used in the present invention refers to an organic substance having electrical conductivity, and a conductive polymer or fine carbon is particularly preferable.

Examples of conductive polymers include polyaniline-based polymers, polypyrrole-based polymers and polythiophene-based polymers. The substances on which these polymers are based refers to the substance that constitutes the basic primary chain structure, all of these polymers that demonstrate electrical conductivity as a result of undergoing chemical modification are included. Examples include polyaniline, polypyrrole, polythiophene, poly(3-alkylthiophene), poly(dialkylthiophene), poly(para-phenylene), poly(paraphenylene vinylene), polyacetylene, polyphenylene vinylene and poly(3,4-ethylenedioxy)thiophene (PEDOT). Specific examples include PEDOT/PSS obtained by dispersing PEDOT in water on the nanometer order using polystyrene sulfonate (PSS) as a combination dopant/dispersant. PEDOT/PSS is widely known as Baytron manufactured by the H.C. Starck Corp. In addition, in the case of using PEDOT/PSS, the addition of dimethylsulfoxide, N-methyl-2-pyrrolidone or ethylene glycol and the like at about 5% based on the total amount of the liquid dispersion is known to dramatically improve electrical conductivity. One type of the aforementioned conductive polymer may be used alone or two or more types may be used in combination.

On the other hand, examples of fine carbon include carbon nanotubes, carbon nanofibers, carbon nanoparticles, carbon nanohorns and fullerene as well as mixtures of two or more types thereof. Carbon nanotubes consist of single-layer carbon nanotubes having a structure in which a single-layer graphite sheet is rounded into a cylindrical shape, and multi-layer carbon nanotubes in which single-layer carbon nanotubes are laminated in the shape of a concentric circle. Since it is preferable to have a large specific surface area in order to demonstrate high conductivity, single-layer carbon nanotubes are preferable. In addition, purity is preferably as high as possible in order to obtain high conductivity, and purity is preferably 90% or more. One type of the aforementioned fine carbon may be used alone or two or more types may be used in combination.

Conductive polymers or fine carbon may be respectively used alone, or a conductive polymer and fine carbon may be used in combination.

Next, an explanation is provided of the step for mixing the modified fine cellulose and the conductive substance.

Modified Fine Cellulose and Conductive Substance Mixing Step

Examples of the step for mixing the modified fine cellulose and the conductive substance include:

(1) a method in which a liquid dispersion is prepared by mixing a liquid dispersion containing modified fine cellulose with a liquid dispersion containing a conductive substance from a dispersed state;

(2) a method in which a liquid dispersion is prepared after mixing a modified fine cellulose powder with a liquid dispersion containing a conductive substance;

(3) a method in which a liquid dispersion is prepared after mixing a liquid dispersion containing modified fine cellulose with a conductive substance powder; and, (4) a method in which a liquid dispersion is prepared by re-dispersing after mixing a modified fine cellulose powder and a conductive substance powder.

The method of (1) or (3) is preferable since the cellulose ends up aggregating resulting in less likelihood of re-dispersion if re-dispersion is carried out after drying the modified fine cellulose. With respect to the conductive substance as well, the method of (1) is more preferable since being in a dispersed state prior to mixing facilitates dispersion after mixing. At this time, the conductive substance is preferably mixed at a weight ratio of 0.01 to 1 based on a value of 1 for the modified fine cellulose.

In addition, in the present invention, an ionic liquid may be added to the reaction system when dispersing the conductive substance and when mixing the modified fine cellulose with the conductive substance in order to improve conductivity and film flexibility. Although a hydrophilic ionic liquid or hydrophobic ionic liquid may be used, since water is preferably used for the dispersion medium, a hydrophilic ionic liquid is preferable. Examples of hydrophilic ionic liquids include 1,3-dimethylimidazolium dimethyl phosphate, 1-butyl-3-methylimidazolium hexafluorophosphate, 1-ethyl-3-methylimidazolium ethyl sulfate, 1-ethyl-3-methylimidazolium hydrogen sulfate, 1-ethyl-3-methylimidazolium methane sulfonate, 1-ethyl-3-methylimidazolium trifluoromethane sulfonate, 1-hexyl-3-methylimidazolium chloride, 1-methyl-3-n-octylimidazolium chloride, 1-methyl-3-propylimidazolium iodide, 1-ethyl-3-methylpyridinium ethyl sulfate and N,N-diethyl-N-methyl-N-(2-methoxyethyl) ammonium tetrafluoroborate. However, any hydrophilic ionic liquid can be used provided it is a hydrophilic ionic liquid. At this time, the ionic liquid is preferably added at a weight ratio of 0.01 to 0.3 based on a value of 1 for the modified fine cellulose.

Examples of methods used in the step for forming a film using a liquid dispersion containing the modified fine cellulose of the present invention or a liquid dispersion containing the modified fine cellulose and a conductive substance include a method in which a film is obtained by coating the aforementioned liquid dispersion onto a base material and removing the formed film, and a method in which a film is obtained by casting.

In addition, examples of methods used to obtain a conductive film by coating a conductive substance onto a modified fine cellulose film of the present invention include coating methods using a comma coater, roll coater, reverse roll coater, gravure coater, microgravure coater, air knife coater, bar coater, wire bar coater, die coater, dip coater, blade coater, brush coater, curtain coater, slot die coater or spin coater.

In addition, plastic materials composed of various polymer compositions can be used for the base material for forming a conductive film used in the present invention or other base material that composes the conductive film. Examples of plastic materials used include polyolefin-based plastic materials such as polyethylene or polypropylene, polyester-based plastic materials such as polyethylene terephthalate or polyethylene naphthalate, cellulose-based plastic materials such as triacetyl cellulose, diacetyl cellulose or cellophane, polyamide-based plastic materials such as nylon 6 or nylon 66, acrylic plastic materials such as polymethyl methacrylate, as well as polystyrene, polyvinyl chloride, polyimide, polyvinyl alcohol, polycarbonate and ethylene vinyl alcohol. In addition, organic polymer materials having as components thereof at least one or more types of the aforementioned plastic materials, copolymers thereof, or chemically modified forms thereof, can also be used.

In addition, a fluorine-based or silicone-based mold release agent may be contained in the base material, or a mold release agent may be preliminarily coated onto the base material to form a mold release layer, in order to facilitate removal of the conductive film from the base material, for the base material for forming the conductive film used in the present invention. In addition, surface modification such as corona treatment, plasma treatment, flame treatment, ozone treatment or anchor coating treatment may be preliminarily carried out on the surface of the other base material that composes the conductive film in order to improve adhesion with the film containing the modified fine cellulose.

Moreover, the use of materials that reduce the burden on the environment as much as possible has come to be considered to be effective in recent years. A base material containing a bioplastic chemically synthesized from plants such as polylactic acid or biopolyolefins and the like or a base material containing plastics produced by microorganisms such as hydroxyalkanoates can be used for the other base material that composes the conductive film of the present invention. Alternatively, paper obtained by going through steps such as conversion of natural fibers such as those from wood or vegetation into pulp followed by production of paper or non-woven fabric composed of natural fibers can also be used. Moreover, base materials containing cellophane, acetylated cellulose or cellulose derivatives and the like, including cellulose-based materials, can also be used.

In addition, the haze value of the conductive film of the present invention when in the form of a film is 30% or less and preferably 10% or less. If the haze value exceeds 30%, application to fields requiring transparency, such as optical applications and display applications, is impaired.

EXAMPLES

Although the following provides a detailed explanation of the present invention based on examples thereof, the technical scope of the present invention is not limited to these examples.

Manufacturing Example

TEMPO Oxidation of Cellulose 30 g of softwood bleached kraft pulp were suspended in 1800 g of distilled water followed by the addition of a solution containing 0.3 g of TEMPO and 3 g of sodium bromide dissolved in 200 g of distilled water and cooling to 20° C.

220 g of an aqueous sodium hypochlorite solution having a concentration of 2 mol/l and density of 1.15 g/ml adjusted to pH 10 with 1 N aqueous HCl solution were added by dropping therein to initiate an oxidation reaction.

The temperature in the reaction system was held at 20° C. at all times, and decreases in pH during the reaction were prevented by continuously maintained at pH 10 by adding 0.5 N aqueous sodium hydroxide solution. The reaction was stopped by adding an adequate amount of ethanol when the sodium hydroxide reached 2.5 mmol/g based on the weight of cellulose. Subsequently, hydrochloric acid was added until the pH reached 3 followed by repeatedly washing with distilled water to obtain modified cellulose.

0.1 g of the resulting oxidized pulp is weighed out as the solid fraction weight thereof and dispersed in water to a concentration of 1% followed by the addition of hydrochloric acid to adjust the pH to 3. Subsequently, when the amount of carboxyl groups (mmol/g) was determined by conductometric titration using 0.5 N aqueous sodium hydroxide solution, it was found to be 1.6 mmol/g.

<Preparation of Liquid Dispersion Containing Modified Fine Cellulose>

4 g of the aforementioned TEMPO-oxidized pulp were dispersed in 396 g of distilled water followed by adjusting the pH to 10 using aqueous sodium hydroxide solution. The prepared liquid dispersion was subjected to refining treatment for 60 minutes with a mixer to prepare a liquid dispersion containing modified fine cellulose.

Example 1

100 mg of single-layer carbon nanotubes were added to 20 ml of water followed by stirring to a uniformly dispersed state. Moreover, 5 g of the liquid dispersion containing modified fine cellulose prepared in the aforementioned manufacturing example were added followed by again stirring to uniformity. The prepared liquid dispersion was cast onto a polystyrene plate and allowed to air-dry at room temperature to obtain a conductive film using carbon nanotubes for the conductive substance.

Example 2

10 g of 1% PEDOT/PSS (Baytron PH500, H. C. Starck Corp.) and 5 mg of dimethylsulfoxide were stirred until uniformly dispersed. Moreover, 5 g of the liquid dispersion containing modified fine cellulose prepared in the aforementioned manufacturing example were added followed by again stirring to uniformity. The prepared liquid dispersion was cast onto a polystyrene plate and allowed to air-dry at room temperature to obtain a conductive film using PEDOT/PSS for the conductive substance.

Example 3

5 g of the liquid dispersion containing modified fine cellulose prepared in the aforementioned manufacturing example were cast onto a polystyrene plate and allowed to air-dry at room temperature. 1% PEDOT/PSS (5% dimethylsulfoxide) was dropped onto the resulting cellulose film followed by forming a film by spin coating and drying to obtain a conductive film.

Comparative Example 1

5 g of the liquid dispersion containing modified fine cellulose prepared in the aforementioned manufacturing example were cast onto a polystyrene plate and allowed to air-dry at room temperature to obtain a cellulose film.

Comparative Example 2

50 mg of the modified cellulose of the aforementioned manufacturing example as the solid fraction thereof were suspended in water followed by casting onto a polystyrene plate and air-drying at room temperature to obtain modified cellulose paper.

Comparative Example 3

10 g of 1% PEDOT/PSS and 5 mg of dimethylsulfoxide were stirred until uniformly dispersed. Moreover, 5 g of a suspension of the modified cellulose prepared in the aforementioned manufacturing example were added and again stirred. The prepared suspension was cast onto a polystyrene plate and allowed to air-dry at room temperature to obtain conductive paper using PEDOT/PSS for the conductive substance.

<Evaluation of Electrical Conductivity>

The resulting films or paper of the aforementioned Examples 1 to 3 and Comparative Examples 1 to 3 were evaluated for electrical conductivity using a surface resistance meter in compliance with JIS-K6911. The results are shown in Table 1.

<Film Viscoelasticity>

The resulting films of the aforementioned Examples 1 to 3 and Comparative Examples 1 to 3 were cut out into test pieces of 10 mm×20 mm followed by measurement of viscoelasticity (50 mN) in the extension mode at a frequency of 1 Hz, heating rate of 2° C./min and temperature range of 20° C. to 180° C. using a viscoelasticity analyzer (Ezstar DMS100, SII Nanotechnology Inc.). The value of E' at 25° C. was determined. The results are shown in Table 1.

<Film Haze Value>

The haze values of the resulting films of the aforementioned Examples 1 to 3 and Comparative Examples 1 to 3 were measured using a haze meter. The results are shown in Table 1.

TABLE 1

|  | Surface resistance ($\Omega$/sq) | E' (MPa) | Haze value (%) |
| --- | --- | --- | --- |
| Example 1 | $1.5 \times 10^5$ | $4.7 \times 10^2$ | 24 |
| Example 2 | $2.3 \times 10^5$ | $4.9 \times 10^2$ | 21 |
| Example 3 | $1.7 \times 10^6$ | $5.2 \times 10^2$ | 8 |
| Comp. Ex. 1 | $1.2 \times 10^{10}$ | $5.3 \times 10^2$ | 3 |
| Comp. Ex. 2 | $3.8 \times 10^{11}$ | $1.1 \times 10^0$ | 97 |
| Comp. Ex. 3 | $4.7 \times 10^7$ | $1.3 \times 10^6$ | 99 |

On the basis of the results of Table 1, favorable conductivity, high transparency and high strength were able to be realized by the conductive film of the present invention. On the basis of these findings, a conductive film was determined to be able to be manufactured that can be applied to optical applications and display applications by compounding environmentally-friendly cellulose free of fossil fuel resources with a conductive substance.

INDUSTRIAL APPLICABILITY

As has been described above, the conductive film containing modified fine cellulose and a conductive substances obtained according to the present invention demonstrates adequate transparency and strength and has high electrical conductivity, thereby enabling it to be applied in various fields such as optical applications and display applications.

The invention claimed is:
1. A conductive film comprising:
a cellulose layer comprising a cellulose fiber having at least a carboxyl group in an amount of 1.0 mmol/g to 2.0 mmol/g, said cellulose fiber having a fiber width of 1 nm to 500 nm; and
a conductive layer formed on the cellulose layer, the conductive layer consisting of one or more conductive substances.

2. The conductive film according to claim 1, wherein the cellulose is natural cellulose having a cellulose I type crystal structure.

3. The conductive film according to claim 2, wherein the one or more conductive substances includes a conductive polymer.

4. The conductive film according to claim 3, wherein the conductive polymer is one or more selected from the group consisting of polythiophene, polypyrrole and polyaniline.

5. The conductive film according to claim 2, wherein the one or more conductive substances includes fine carbon.

6. The conductive film according to claim 2, which further contains an ionic liquid.

7. The conductive film according to claim 2, wherein a haze value of the conductive film is 30% or less.

8. The conductive film according to claim 1, wherein the cellulose is modified by using a co-oxidant in the presence of N-oxyl compound.

9. The conductive film according to claim 8, wherein the N-oxyl compound is 2,2,6,6-tetramethylpiperidinooxy (TEMPO).

10. The conductive film according to claim 8, wherein the co-oxidant is hypochlorite.

11. The conductive film according to claim 3, wherein the conductive polymer is one or more selected from the group consisting of polyaniline, polypyrrole, poly thiophene, poly(3-alkylth iophene), poly(dialkylth iophene), poly(para-phenylene), poly(para-phenylene vinylene), polyacetylene, polyphenylene vinylene and poly(3,4-ethylenedioxy)thiophene (PEDOT).

12. The conductive film according to claim 5, wherein the fine carbon is one or more selected from the group consisting of carbon nanotubes, carbon nanofibers, carbon nanoparticles, carbon nanohorns and fullerene.

13. A manufacturing method of a conductive film, comprising:

oxidizing cellulose to form an oxidized cellulose;

preparing a liquid dispersion containing oxidized cellulose by dispersing and refining the oxidized cellulose in a dispersion medium to form a modified cellulose fiber having a carboxyl group on a surface thereof;

forming a film containing the modified cellulose fiber by drying the liquid dispersion; and forming a conductive film consisting of one or more conductive substances by coating the conductive substances onto the surface of the film containing the modified cellulose fiber.

14. The manufacturing method according to claim 13, wherein the cellulose is oxidized by using a co-oxidant in the presence of N-oxyl compound.

15. The manufacturing method according to claim 14, wherein the N-oxyl compound is 2,2,6,6-tetramethylpiperidinooxy (TEMPO).

16. The manufacturing method according to claim 14, wherein the co-oxidant is hypochlorite.

17. The manufacturing method according to claim 10, wherein the conductive substance is one or more selected from the group consisting of polyaniline, polypyrrole, poly thiophene, poly(3-alkylthiophene), poly(dialkylthiophene), poly(para-phenylene), poly(paraphenylene vinylene), polyacetylene, polyphenylene vinylene and poly(3,4-ethylenedioxy)thiophene (PEDOT).

18. The manufacturing method according to claim 13, wherein the conductive substance is one or more selected from the group consisting of carbon nanotubes, carbon nanofibers, carbon nanoparticles, carbon nanohorns and fullerene.

* * * * *

UNITED STATES PATENT AND TRADEMARK OFFICE
CERTIFICATE OF CORRECTION

PATENT NO.          : 9,243,073 B2
APPLICATION NO.     : 13/634693
DATED               : January 26, 2016
INVENTOR(S)         : Mitsuharu Kimura et al.

Page 1 of 1

It is certified that error appears in the above-identified patent and that said Letters Patent is hereby corrected as shown below:

In the claims

Column 11, Line 29, Claim 11
Delete "poly(3-alkylth    iophene)," and insert -- poly(3-alkylthiophene), --, therefor.

Column 11, Line 29-30, Claim 11
Delete "poly(dialkylth    iophene)," and insert -- poly(dialkylthiophene), --, therefor.

Signed and Sealed this
Tenth Day of May, 2016

Michelle K. Lee
*Director of the United States Patent and Trademark Office*